United States Patent [19]

Bolender

[11] Patent Number: 5,053,588
[45] Date of Patent: Oct. 1, 1991

[54] CALIBRATABLE CRASH SENSOR

[75] Inventor: Robert J. Bolender, Pasadena, Calif.

[73] Assignee: TRW Technar Inc., Irwindale, Calif.

[21] Appl. No.: 482,232

[22] Filed: Feb. 20, 1990

[51] Int. Cl.$^5$ ............................................. H01H 35/14
[52] U.S. Cl. ...................... 200/61.45 R; 200/61.45 M; 200/61.53
[58] Field of Search ............ 200/61.45 R–61.53, 200/82 E

[56] References Cited

U.S. PATENT DOCUMENTS

| | | | |
|---|---|---|---|
| 2,997,557 | 8/1961 | Gillmor et al. | 200/61.45 R |
| 3,485,973 | 12/1969 | Kaiser | 200/61.45 R |
| 3,737,599 | 6/1973 | Zuvela | 200/61.45 R |
| 3,974,350 | 8/1976 | Breed | 200/61.53 |
| 4,097,699 | 6/1978 | Larson | 200/61.45 R |
| 4,284,863 | 8/1981 | Breed | 200/61.53 |
| 4,329,549 | 5/1982 | Breed | 200/61.45 M |
| 4,816,627 | 3/1989 | Janotik | 200/61.45 M |
| 4,827,091 | 5/1989 | Behr | 200/61.45 M |
| 4,900,880 | 2/1990 | Breed | 200/61.45 M |

*Primary Examiner*—J. R. Scott
*Attorney, Agent, or Firm*—Tarolli, Sundheim & Covell

[57] ABSTRACT

A vehicle crash sensor which operates to activate a passenger safety device such as an airbag inflator is calibratable to provide a desired sensitivity of the sensor to decelerating crash pulses of varying magnitude and duration. The sensor includes an adjustable member which varies the volume of a controlled quantity of damping fluid simultaneously with variations of the piston travel distance.

30 Claims, 3 Drawing Sheets

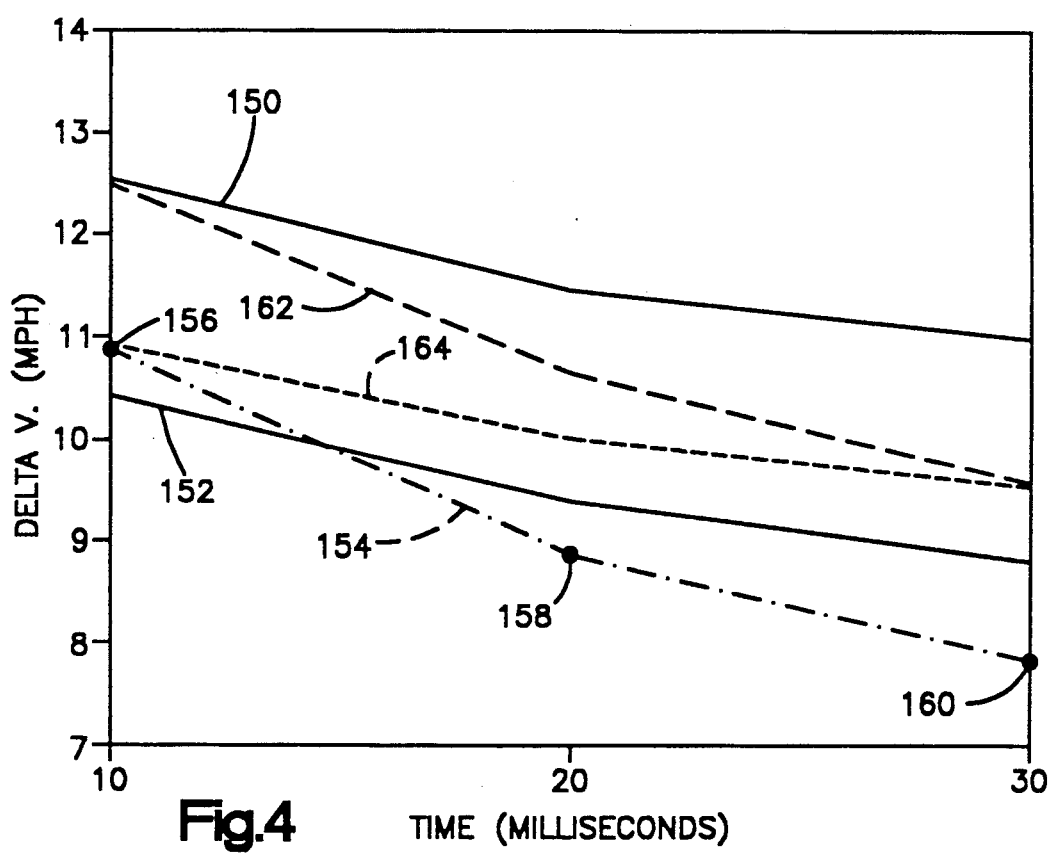

CALIBRATABLE CRASH SENSOR

FIELD OF THE INVENTION

The present invention relates to the art of vehicle crash sensors which respond to sudden deceleration of the vehicle to activate a passenger safety device such as an inflatable airbag, and particularly relates to a crash sensor which is calibratable to enable the sensor to respond to deceleration pulses of selected magnitude and duration.

BACKGROUND OF THE INVENTION

Various vehicle crash sensors are known which close an electrical circuit to activate an airbag inflator in response to deceleration experienced under vehicle crash conditions. One type of crash sensor comprises a piston which is movable through a passageway. The piston has a rest position in engagement with a piston seat and an actuated position in engagement with electrical contacts. The electrical contacts form part of a circuit for activating an airbag inflator. The piston is biased into the rest position under normal vehicle operating conditions. The sensor operates to close the electrical circuit in response to a decelerating crash pulse of sufficient magnitude and duration to move the piston from the rest position to the actuated position against the bias and against damping forces exerted on the piston by fluid through which the piston moves.

As the piston moves, the fluid is forced to flow around the moving piston through a clearance between the piston and a surrounding passageway wall. Damping forces exerted by the fluid control movement of the piston between the rest position and the actuated position, and affect sensitivity and performance of the sensor.

One such deceleration sensor is shown in U.S. Pat. No. 4,329,549 wherein a piston is biased into the rest position by means of a magnet located behind the piston seat. A crash force moves the piston out of the rest position. As the piston moves, fluid damping forces act on the piston. Fluid damping is controlled by proportioning the diameters of the piston and the surrounding passageway wall to provide a selected clearance of such size a to restrict the flow of fluid past the piston as the piston traverses the passageway. The performance of the sensor in response to a crash pulse therefore depends upon maintenance of manufacturing tolerances between the diameter of the piston and the diameter of the passageway. Such tolerances are known to call for a high degree of precision, and consequently to be difficult and costly to maintain. Furthermore, the fluid damping cannot be adjusted.

U.S. Pat. No. 4,284,863 shows a crash sensor wherein a piston is biased into a rest position in engagement with a piston seat by a spring. As the piston moves away from the piston seat in response to a deceleration pulse, damping fluid flows through a peripheral clearance between the piston and a bore in which the piston moves, or alternately through an orifice communicating the bore with the external atmosphere of the sensor. In either case, the effects of fluid damping depend on precisely machined dimensional tolerances at the clearance between the piston and the bore.

Another type of sensor is shown in U.S. Pat. No. 3,485,973. Performance characteristics of the sensor with respect to deceleration pulses of varying magnitude and duration are selected by means of adjusting the magnetic force biasing the piston toward the rest position. A threaded stop pin is movable against the piston to move the rest position of the piston axially toward and away from a magnet located at the base of the bore in which the piston moves. Movement of the rest position of the piston axially with respect to the magnet affects the threshold level of force required to unseat the piston as well as the duration of a deceleration pulse required to move the piston into the actuated position against the magnetic force.

The prior art thus fails to provide a vehicle crash sensor which is adjustable to yield a desired sensitivity by means of varying the effect of fluid damping without varying the threshold biasing force on the piston.

SUMMARY OF THE INVENTION

In accordance with the present invention, a deceleration sensor comprises a piston having a front side, a rear side, a rest position in engagement with a piston seat, and an activated position a predetermined distance from the rest position. Biasing means exerts a threshold retaining force to releasably hold the piston in the rest position. The piston is movable from the rest position to the activated position in response to deceleration. As the piston moves away from the rest position, damping fluid pressure increases at the front side of the piston and decreases at the rear side of the piston. A control space contains a volume of the damping fluid at the rear side of the piston when the piston is in the rest position, and calibrating means is adjustable to vary the volume of the the control space without changing the threshold retaining force. The invention thereby enables the fluid damping forces to be adjusted through variation of the control space volume.

Fluid damping forces which resist movement of the piston are a result of the difference between the increasing fluid pressure at the front side of the moving piston and the decreasing fluid pressure at the rear side. The volume of fluid at the rear side of the piston influences the decrease in fluid pressure at the rear side when the piston moves. A lesser volume of fluid at the rear side will experience a more sudden (higher rate) decrease in pressure for a given amount of piston movement than will a greater volume of fluid. Enlarging the control space volume to increase the volume of fluid behind the piston will therefore inhibit the rate of decrease in fluid pressure experienced at the rear side when the piston moves. The difference between the rate of increase of the pressure at the front side and the rate of the decrease of the pressure at the rear side of the moving piston, and consequently the fluid damping forces, will thereby be reduced.

The invention enables the sensor to be manufactured with dimensional tolerances which are not as limited as those previously required to control fluid damping forces on the moving piston, because the fluid damping forces can be adjusted to meet the desired performance specifications after components of the sensor are manufactured. Calibration of a sensor in accordance with the invention can be accomplished simply by varying only the fluid damping force since the threshold level of force required to unseat the piston is not changed.

Further in accordance with the invention, the sensor includes means for varying the distance between the rest position and the actuated position of the piston simultaneously with varying of the control space volume. The invention thereby enables adjustment of the distance over which the piston must move through the damping fluid as well as the pressure exerted on the piston by the damping fluid.

In accordance with a preferred embodiment of a sensor embodying the present invention, the biasing means includes a magnet fixed relative to the piston seat. The means for varying the distance between the rest position and the activated position of the piston includes means for moving the piston seat and the magnet together with respect to the activated position. Preferably, the rest position of the piston is within a piston sleeve, and the piston seat and magnet are movable axially with respect to the sleeve. The piston seat and magnet are carried on an adjustable sleeve having an open end and a closed end. The open end of the adjustable sleeve is telescopically associated with the piston sleeve. The control space is between the closed end of the adjustable sleeve and the piston. The adjustable sleeve has a cylindrical inner surface received coaxially over a cylindrical outer surface of the piston sleeve, and a fluid seal is positioned between the cylindrical inner and outer surfaces. Thread means shift the coaxial surfaces axially with respect to each other.

BRIEF DESCRIPTION OF THE DRAWINGS

The foregoing and other features of the present invention will become apparent to those skilled in the art to which the invention relates upon reading the following description of a preferred embodiment of the invention in view of the accompanying drawings wherein:

FIG. 4 is a graphic representation of performance characteristics of a calibratable crash sensor embodying the present invention.

DESCRIPTION OF PREFERRED EMBODIMENT

Figure 1:
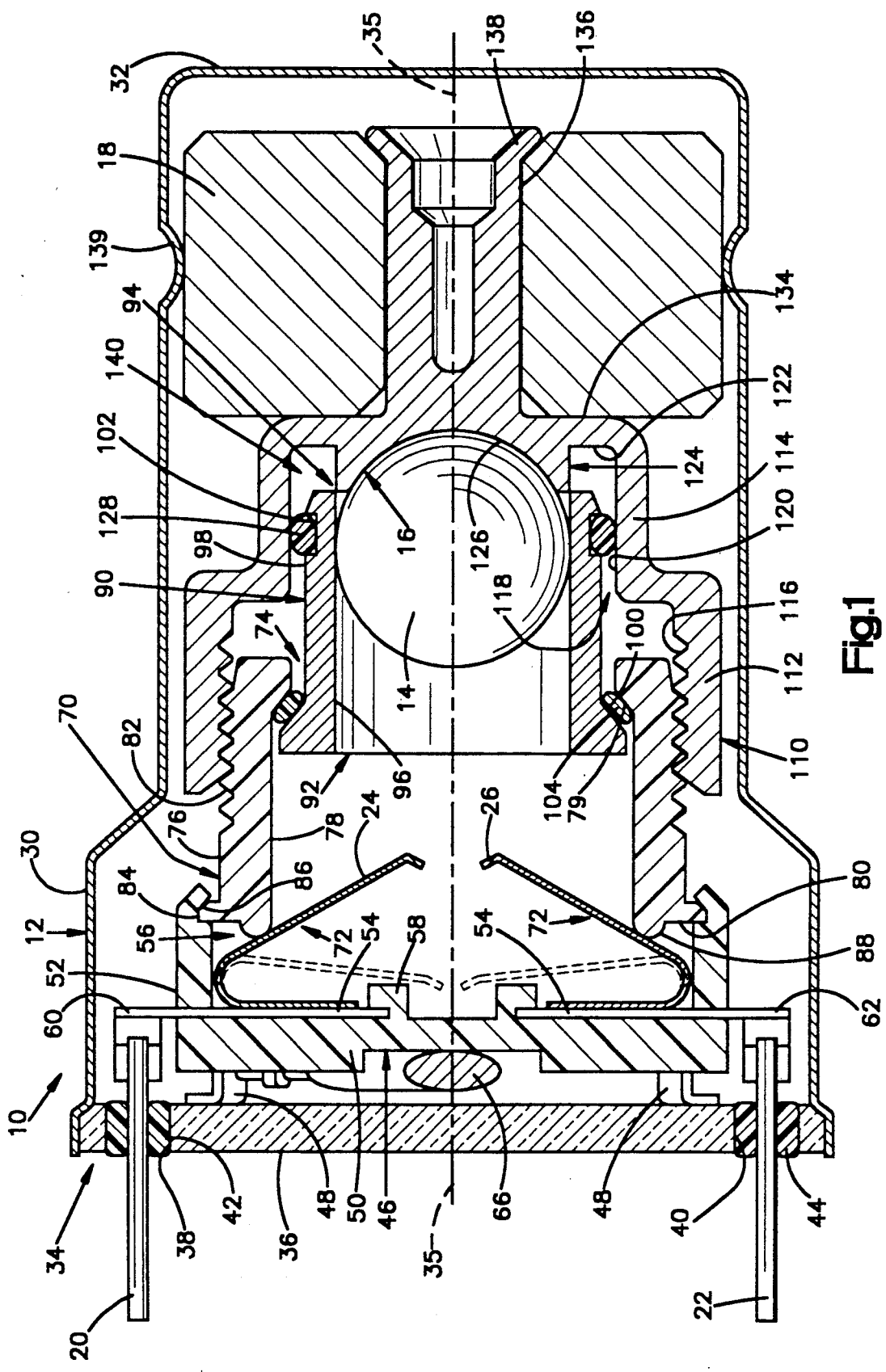
FIG. 1 is a cross sectional view of a calibratable crash sensor in accordance with the present invention.

In FIG. 1 there is shown a calibratable crash sensor 10 which generally comprises a housing 12 enclosing a spherical piston 14. The piston 14 is biased into engagement with a piston seat 16 by a permanent magnet 18. A pair of electrical leads 20 and 22 are respectively connected to a pair of electrical contacts 24 and 26, and extend out of the housing 12 to enable connection of the sensor 10 to an electrical circuit associated with a passenger safety device, such as an airbag inflator.

The housing 12 comprises a cylindrical metal body member 30 having a closed end 32, an open end 34, and an axis 35. A stainless steel closure piece 36 is closely fitted and sealed in the open end 34 such that the housing 12 is hermetically sealed to contain a fluid, preferably air. The closure piece 36 includes a pair of apertures 38 and 40 through which the electrical leads 20 and 22 extend. Glass seals 42 and 44 hermetically seal the apertures 38 and 40.

A plastic plug 46 inside the housing 12 is rigidly connected to the closure piece by mounting feet 48. The plug 46 includes a disc-shaped portion 50 that extends generally parallel to the closure piece 36, and a cylindrical wall 52 that extends axially away from the disc-shaped portion 50. The cylindrical wall 52 and the adjacent radially extending surface 54 of the disc-shaped portion 50 define a cavity 56. A stop ring 58 projects axially from the surface 54. A pair of conductive insert 60 and 62 extend respectively from the electrical leads 20 and 22 through the plug 46 to positions extending along the surface 54. One electrical contact 24 is conductively mounted to one insert 60, and the other electrical contact 26 is likewise conductively mounted to the other insert 62.

A diagnostic circuit comprises a conductive bridge (not shown) embedded in the plastic plug 46 to conductively connect the inserts 60 and 62 through a resistor 66. The diagnostic circuit enables the conductive connection between the electrical leads 20, 22 and the conductive inserts 60, 62 to be tested. The test current, when applied between the leads 20 and 22 through the diagnostic circuit, is at a level below that which would activate the associated passenger safety device a is known.

The crash sensor 10 includes a threaded sleeve 70 coaxial with the housing 12. The threaded sleeve 70 comprises first and second open ends 72 and 74, an outer cylindrical surface 76, an inner cylindrical surface 78, and an annular end surface 80 at its first open end 72. The inner cylindrical surface 78 includes a shoulder portion 79. The outer cylindrical surface 76 includes outer threads 82 extending from the second open end 74. A radially extending flange 84 surrounds the first open end 72. The flange 84 is tightly received in a recess 86 in the cylindrical wall 54 of the plug 46 to hold the threaded sleeve 70 from movement with respect to the plug 46. The annular end surface 80 of the threaded sleeve 70 includes a raised rib 88 against which the flexible electrical contacts 24 and 26 rest. The electrical contacts 24 and 26 are preferably formed of resilient material and are bent into the configurations shown in order to bias themselves into contact with the raised rib 88. This assures that the contacts 24, 26 are positively located in position and will not rattle or vibrate.

A piston sleeve 90 includes first and second open ends 92 and 94, an inner cylindrical surface 96, and an outer cylindrical surface 98. The outer cylindrical surface 98 includes a shoulder portion 100 surrounding the first open end 92, and an annular recess 102 adjacent to the second open end 94. The piston sleeve 90 is telescopically received coaxially within the threaded sleeve 70 with the shoulder portion 100 adjacent to the shoulder portion 79 of the threaded sleeve 70. An 0-ring seal 104 is positioned between the adjacent shoulder portions 79 and 100. The piston sleeve 90 has an inside diameter slightly greater than the diameter of the spherical piston 14 to permit movement of the piston 14 through the sleeve.

An adjustable sleeve 110 includes a first axial section 112 and a radially inward second axial section 114. The first axial section 112 is telescopically received coaxially over the threaded sleeve 70 and includes inner threads 116. The inner threads 116 are engaged with the outer threads 82 of the threaded sleeve 70 so that on relative rotation the adjustable sleeve 110 moves axially with respect to the threaded sleeve 70 and the piston sleeve 90.

The second axial section 114 of the adjustable sleeve 110 includes an open end 118, a cylindrical inner surface 120, and a bottom wall 122 having a piston seat portion 124. The piston seat portion 124 of the bottom wall 122 includes a spherically contoured piston seat surface 126 complementary to the contour of the spherical piston 14 to provide a surface against which the piston 14 abuts when in the rest position. The second axial section 114 of the adjustable sleeve 110 is telescopically received coaxially over the piston sleeve 90. An O-ring seal 128 in the annular recess 102 at the outer cylindrical surface 98 of the piston sleeve 90 provide a fluid seal between the piston sleeve 90 and the second axial section 114 of the adjustable sleeve 110.

The adjustable sleeve 110 further includes a rear surface 134 and a mandrel 136 having a radially flared section 138. The magnet 18 is received o the mandrel 136 in a position abutting against the rear surface 134 and is restrained against movement with respect to the mandrel 136 by the radially flared section 138. The magnet 18 biases the piston 14 into a rest position in engagement with the piston seat surface 126. An indented ring 139 formed in the metal body member 30 of the housing 12 presses against the magnet 18 to provide a mechanical centering support for the components within the housing 12 in addition to the mounting feet 48.

A control space 140, the volume of which may be adjusted, includes the space within the second axial section 114 of the adjustable sleeve 110 between the O-ring seal 128 and the bottom wall 122, and extends into the piston sleeve 90 to include the space between the piston 14 and the second open end 94 of the piston sleeve 90.

Figure 2:
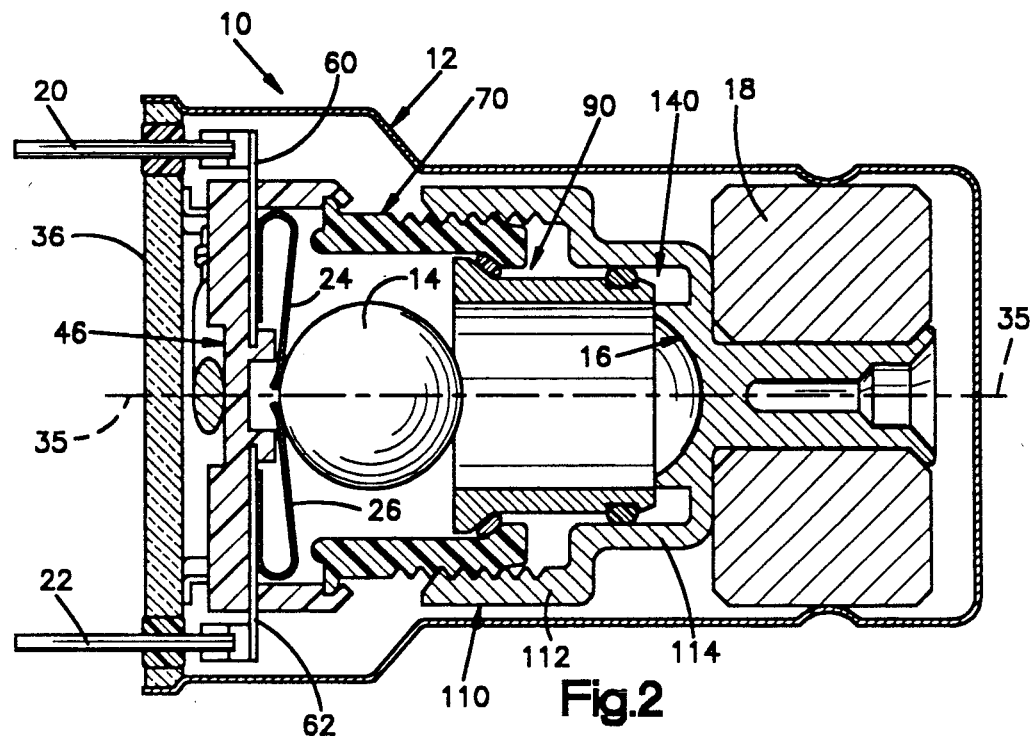
FIG. 2 is a cross sectional view of the crash sensor of FIG. 1 in an actuated condition.
Figure 3:
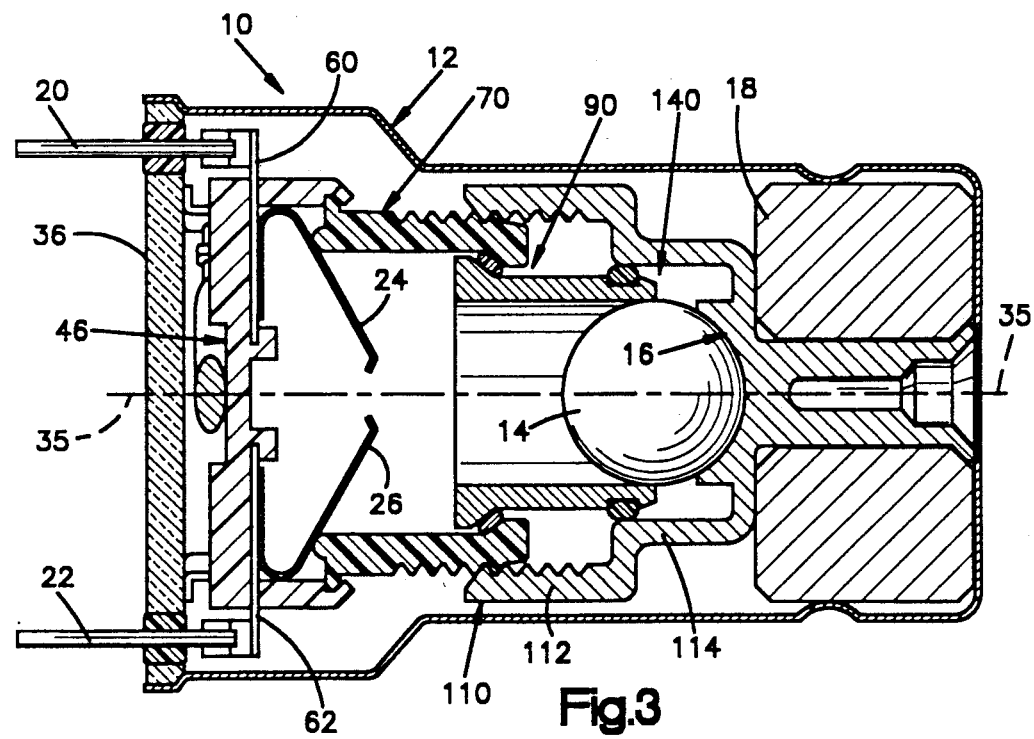
FIG. 3 is a cross sectional view of the crash sensor of FIG. 1 showing parts in different positions.

Axial movement of the adjustable sleeve 110 with respect to the threaded sleeve 70 and the piston sleeve 90 from the position shown in FIG. 2 to the position shown in FIG. 3 simultaneously moves the bottom wall 122, the piston seat surface 126, and the magnet 18 in a direction to the right in the Figures. The volume of the control space 140 is thereby increased simultaneously with an increase in the distance between the rest position and the activated position of the piston 14. However, the spacing between the magnet 18 and the piston seat 16 remains unchanged.

The sensor 10 operates to activate a passenger safety device in response to a decelerating crash pulse experienced by a vehicle. As the vehicle and the sensor 10 decelerate, the piston 14 moves from the rest position shown in FIG. 1 toward the fully activated position shown in FIG. 2 wherein the piston 14, which is made of an electrical conducting material, bridges the electrical contacts 24 and 26 to close the circuit between the electrical leads 20 and 22.

Movement of the piston 14 away from the rest position is resisted by the magnet 18 and by the fluid within the housing 12. The magnet 18 exerts a threshold level of force retaining the piston 14 against the piston seat 16, which force must be overcome in order to unseat the piston 14, and continues to exert a relatively diminishing force against the piston 14 as it moves away from the magnet 18 toward the activated position. The fluid within the housing 12 exerts a damping force against the moving piston 14. Movement of the piston 14 causes an increase in fluid pressure at the leading side of the piston 14 and a decrease in fluid pressure at the trailing side. The sensor 10 thereby responds to a deceleration pulse of sufficient magnitude and duration to move the piston 14 out of the rest position and across the distance between the rest position and an activated position bridging the contacts 20, 22 against the magnetic and fluid damping forces.

FIG. 4 graphically illustrates performance of the sensor 10 in response to various deceleration pulses. Magnitude of a deceleration pulse is measured on the vertical axis in FIG. 4 and is expressed in terms of a change in vehicle velocity. Duration of a deceleration pulse is measured on the horizontal axis in FIG. 4 and is expressed in terms of milliseconds. Desired performance characteristics of the sensor 10 are represented by an upper limit line 150 and a lower limit line 152. The sensor 10 is desired ideally to activate the passenger safety device in response to all deceleration pulses represented by points on or above the upper limit line 150, and not to activate the device in response to pulses represented by points below the lower limit line 152. A permissible intermediate zone is defined between the upper and lower limit lines 150 and 152.

Moving vehicles sometimes experience a hammer blow-type of deceleration pulse upon impact with an object or an uneven road surface. Such hammer blow-types of deceleration pulses may exceed the threshold level of force required to unseat the piston 14 against the bias of the magnet 18, but are of a lesser duration than actual crash pulses. Fluid damping forces prevent the piston 14 from moving all the way to the activated position during such low duration pulses so that the magnetic bias can return the piston 14 to the rest position before it reaches its activated position.

Calibration of the sensor 10 in accordance with the present invention enables performance of the sensor 10 to correspond with a desired performance curve drawn on FIG. 4. Measured performance of a sensor can be expressed in terms of threshold points at which the sensor activates the safety device. Test curve 154 represents the measured performance of a sensor having a ten millisecond threshold point 156, a twenty millisecond threshold point 158, and a thirty millisecond threshold point 160. A sensor performing ideally in accordance with the test curve 154 will activate the safety device in response to deceleration pulses represented by points on or above the test curve 154, and will not activate the safety device in response to deceleration pulses represented by points below the test curve 154. Accordingly, calibration of the sensor would be desired to move the performance curve thereof from the position taken by the test curve 154 into a position entirely within the permissible intermediate zone defined between the upper limit line 150 and the lower limit line 152.

In the practice of the invention, it is found that increasing the distance between the rest position of the piston 14 and the activated position causes the measured performance curve of the sensor 10 to move consistently upward in coordinate values of magnitude, such as from the position taken by the test curve 154 in FIG. 4 to the position taken by the distance calibration curve 162. This is a result of the greater time required for a pulse of a given magnitude to cause the piston 14 to traverse the greater distance. However, the extreme ends of the distance calibration curve 162 are relatively close to the upper and lower limit lines 150 and 152. A more desirable calibrated performance curve would extend more consistently within the permissible intermediate zone between the upper and lower limit lines 150 and 152.

In accordance with the invention, it is found that varying the volume of damping fluid at the rear side of the piston 14 results in a variation of the slope of the performance curve as graphically represented in FIG. 4. Accordingly, an increase in the volume of the control space 140 in the sensor 10 will decrease the slope of a performance curve to move such a curve from an orientation such as that taken by the distance calibration curve 162 toward an orientation such as that taken by the volume-distance calibration curve 164. This is a result of the greater volume of fluid behind the piston 14 which inhibits the decrease in pressure experienced at the rear side of the moving piston 14. The pressure differential between the front and rear sides of the piston 14, and hence the damping forces acting against the piston 14, are thereby reduced.

The use of the control space 140 in accordance with the invention enables the fluid damping forces to be adjusted after the components of the sensor 10 are manufactured. Conventional tolerances between the piston 14 and the piston sleeve 90 can be relaxed, since the clearance between those components is no longer a controlling critical factor in performance of the sensor. When calibration is completed, an adhesive is applied to hold the threads 82 and 116 locked together in order to hold the adjustable sleeve 110 in the calibrated position.

Importantly, the preferred embodiment of the invention enables simultaneous adjustment of both the vertical position and the slope of a performance curve as graphically illustrated in FIG. 4. As described above, a change in the axial travel distance between the rest position and the activated position of the piston 14 changes the time required for a deceleration pulse of a given magnitude to move the piston 14 from the rest position to the activated position. This is made evident by a change in the vertical position of a performance curve in FIG. 4. A change in the volume of the control space 140, which changes the rate at which damping fluid pressure decreases behind the moving piston 14, also effects the time required for a pulse of a given magnitude to move the piston 14 from the rest position to the activated position. This is made evident by a change in the slope of a performance curve in FIG. 4. The volume of the control space 140 is therefore related to the piston travel distance. For this reason, an adjustment of only the volume of the control space 140 would have an influence on the effect of a separate, previous adjustment of the piston travel distance. Successive separate adjustments might then be required to compensate for this influence. However, movement of the adjustable sleeve 110 with respect to the threaded sleeve 70 changes the piston travel distance while at the same time changing the volume of the control space 140. The related effects of the piston travel distance and the volume of the control space 140 are adjusted simultaneously rather than separately. A performance curve of the sensor 10 as graphically represented in FIG. 4 will therefore experience a simultaneous change in both slope and vertical position when the adjustable sleeve 110 is moved with respect to the threaded sleeve 70, and the number of steps required to calibrate the sensor 10 is minimized. In the preferred embodiment, the volume of the control space 140 is increased with an increase in the piston travel distance and decreased with a decrease in the piston travel distance.

While the invention has been described with reference to a preferred embodiment, it is to be understood that the invention is not limited to the particular embodiment disclosed and that alterations and modifications can be made within the scope of the invention as set forth in the appended claims Having described a preferred embodiment of the invention, the following is claimed:

1. A deceleration sensor comprising:
 a piston seat;
 a piston having a front side, a rear side, a rest position in engagement with said piston seat, and an activated position spaced a distance from said rest position;
 means for supporting said piston for inertial movement from said rest position to said activated position in response to deceleration;
 means for sensing movement of said piston from said rest position to said activated position to indicate a predetermined amount of deceleration over a time interval;
 biasing means for exerting a retaining force to releasably hold said piston in said rest position;
 means for containing a damping fluid which exerts an increasing pressure on said front side of said piston and a decreasing pressure on said rear side in response to said inertial movement of said piston, and for defining a control volume of said damping fluid at said rear side of said piston; and
 means for varying said control volume while said retaining force is maintained at a constant level.

2. A deceleration sensor as defined in claim 1 wherein said piston is a sphere and said biasing means comprises a magnet.

3. A deceleration sensor as defined in claim 1 wherein said varying means includes means for simultaneously varying said spaced distance and said control volume.

4. A deceleration sensor as defined in claim 3 wherein said biasing means includes a magnet at a position fixed relative to said piston seat, said varying means including means for moving said piston seat and said magnet together relative to said activated position of said piston.

5. A deceleration sensor as defined in claim 4 wherein said supporting means comprises a piston sleeve having an axis, said piston being received within said piston sleeve when in said rest position, said piston seat and said magnet being movable axially relative to said piston sleeve.

6. A deceleration sensor as defined in claim 5 wherein said means for defining said control volume comprises an adjustable sleeve having a closed end, said adjustable sleeve being telescopically movable relative to said piston sleeve, said control volume being defined within said sleeves and extending axially between said closed end of said adjustable sleeve and said piston when said piston is in said rest position.

7. A deceleration sensor as defined in claim 6 wherein said piston seat and said magnet are carried on said adjustable sleeve.

8. A deceleration sensor as defined in claim 7 further comprising a fluid seal between said piston sleeve and said adjustable sleeve, and thread means for moving said sleeves axially relative to each other upon relative rotation of said sleeves about said axis, said piston sleeve having a cylindrical outer surface, said adjustable sleeve having a cylindrical inner surface received over said cylindrical outer surface, said seal being a ring located between said cylindrical surfaces.

9. A deceleration sensor as defined in claim 8 further comprising a housing containing said sleeves, said housing being hermetically sealed to contain said damping fluid.

10. A method of calibrating a deceleration sensor comprising a piston having a front side, a rear side, a rest position, and an activated position, means for biasing said piston into said rest position, means for supporting said piston for inertial movement from said rest position to said activated position in response to deceleration, a fluid for damping said movement of said piston by exerting an increasing pressure at said front side of said piston and a decreasing pressure at said rear side in response to said movement, and means for sensing and indicating movement of said piston from said rest position to said activated position in response to a deceleration pulse of sufficient magnitude and duration to move said piston out of said rest position against a threshold level of said bias and between said positions against said bias and said damping, said method comprising the steps of:

(a) providing a control space for containing a quantity of said fluid at said rear side of said piston;

(b) varying the volume of said control space to vary the volume of said fluid at said rear side of said piston to cause a variation in the rate at which said pressure at said rear side of said piston decreases upon said inertial movement of said piston; and (c) retaining said threshold level of said bias constant while varying said volume.

11. A method as defined in claim 10 further comprising the step of:

(d) varying said known distance from said rest position to said activated position simultaneously with said varying of said volume of said control space.

12. A deceleration sensor comprising:
a piston seat;
a piston having a front side, a rear side, a rest position in engagement with said piston seat, and an activated position a predetermined distance from said rest position;
means for supporting said piston for inertial movement from said rest position to activated position in response to deceleration;
biasing means for exerting a retaining force to releasably hold said piston in said rest position;
means for sensing movement of said piston from said rest position to said activated position to indicate a predetermined amount of deceleration over a time interval;
means for containing a damping fluid which damps said inertial movement of said piston from said rest position to said activated position, and for defining a control space containing a volume of said damping fluid at said rear side of said piston when said piston is in aid rest position, the pressure in which decreases as said piston moves from said rest position toward said activated position; and,
means for adjusting said volume to vary the rate at which said pressure decreases per increment of movement of said piston while maintaining said retaining force at a constant level.

13. A deceleration sensor as defined in claim 12 wherein said piston is a sphere and said biasing means comprises a magnet.

14. A deceleration sensor as defined in claim 12 wherein said means for adjusting said volume simultaneously adjusts said predetermined distance.

15. A deceleration sensor as defined in claim 14 wherein the position of said biasing means is adjusted simultaneously with adjustment of said volume.

16. A deceleration sensor as defined in claim 15 wherein said biasing means comprises a magnet.

17. A deceleration sensor for activating a vehicle occupant safety apparatus in response to deceleration of a vehicle, the safety apparatus including an electrical current path, said deceleration sensor comprising:
a piston seat;
a piston having a front side, a rear side, a rest position in engagement with said piston seat, and an activated position spaced a distance from said rear position;
means for supporting said piston for inertial movement from said rest position to said activated position in response to a predetermined amount of deceleration of the vehicle;
biasing means for exerting a retaining force to releasably hold said piston in said rest position;
means for sensing movement of said piston into said activated position and for enabling electric current to flow along the current path int he safety apparatus to activate the safety apparatus in response to movement of said piston into said activated position;
means for containing a damping fluid for exerting a damping force resisting movement of said piston from said rest position to said activated position; and
means for adjusting said damping force while said retaining force is maintained at a constant level.

18. A deceleration sensor as defined in claim 17 wherein said piston is a sphere and said biasing means comprises a magnet.

19. A deceleration sensor as defined in claim 17 wherein said adjusting means adjusts both said spaced distance and said damping force.

20. A deceleration sensor as defined in claim 19 wherein said adjusting means simultaneously adjusts said spaced distance and said damping force.

21. A deceleration sensor as defined in claim 17 further comprising a structure having a surface adjacent to said piston when said piston is in said rest position, said surface of said structure defining a passage for damping fluid to flow across the surface of said piston in a direction from said front side toward said rear side, said means for containing a damping fluid defining a space for damping fluid at said front side of said piston when said piston is in said rest position, defining a control space for damping fluid at said rear side of said piston when said piston is in said rest position, and sealing said control space for damping fluid in said control space to communicate with damping fluid at said front side of said piston only through said passage when said piston is in said rest position.

22. A deceleration sensor as defined in claim 21 wherein said adjusting means adjusts the volume of said control space.

23. A deceleration sensor as defined in claim 22 wherein said adjusting means adjusts both said spaced distance and said volume of said control space.

24. A deceleration sensor as defined in claim 23 wherein said adjusting means simultaneously adjusts said spaced distance and said volume of said control space.

25. A deceleration sensor as defined in claim 24 wherein said piston is a sphere.

26. A deceleration switch as defined in claim 17 wherein said means for containing a damping fluid contains a quantity of damping fluid for exerting a decreasing pressure on said rear side of said piston in response to said movement of said piston, and comprises means for adjusting the rate at which said pressure decreases.

27. A deceleration sensor as defined in claim 26 wherein said adjusting means adjusts the volume of said quantity of damping fluid.

28. A deceleration sensor as defined in claim 27 wherein said means for containing a damping fluid defines a control space for containing said quantity of damping fluid, said control space having a volume when said piston is in said rest position, said adjusting means adjusting said volume of said control space.

29. An apparatus as defined in claim 26 wherein said adjusting means simultaneously adjusts said spaced distance and said volume of said control space.

30. A deceleration sensor as defined in claim 29 wherein said biasing means comprises a magnet, said magnet and said piston seat being movable together by said adjusting means relative to said activated position of said piston.

* * * * *

UNITED STATES PATENT AND TRADEMARK OFFICE
CERTIFICATE OF CORRECTION

PATENT NO. : 5,053,588
DATED : October 1, 1991
INVENTOR(S) : Robert J. Bolender

It is certified that error appears in the above-identified patent and that said Letters Patent is hereby corrected as shown below:

Column 9, line 43, claim 12, change "aid" to --said--.

Column 10, line 1, claim 17, change "rear" to --rest--.

line 11, delete "int he" and insert --in the--.

Signed and Sealed this

Sixteenth Day of March, 1993

Attest:

STEPHEN G. KUNIN

*Attesting Officer*   Acting Commissioner of Patents and Trademarks